A. W. POWERS.
Grain Winnower.
No. 86,687. Patented Feb. 9, 1869.
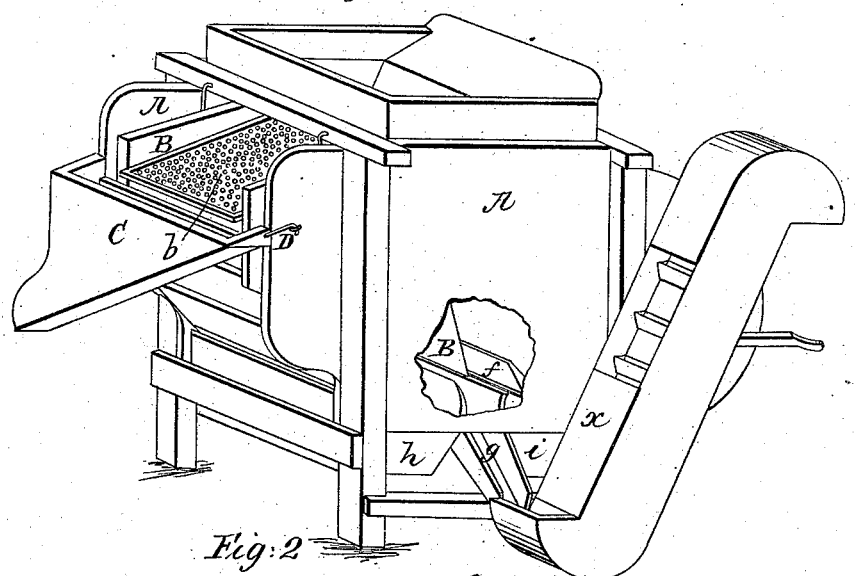
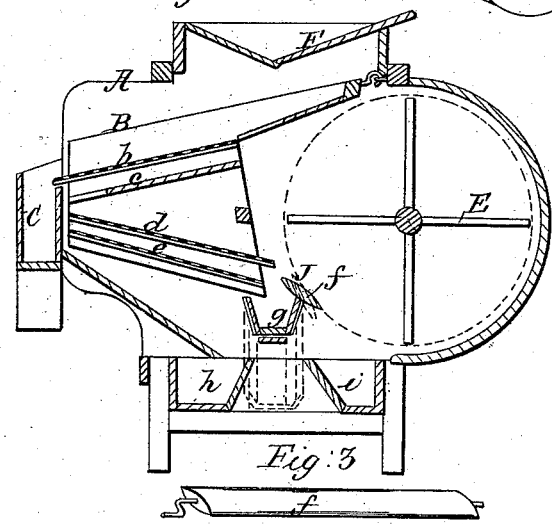

A. W. POWERS, OF BARRINGTON, ILLINOIS, ASSIGNOR TO H. W CRABTREE AND JOHN C. WILTSIE.

Letters Patent No. 86,687, dated February 9, 1869.

IMPROVEMENT IN GRAIN-SEPARATORS.

The Schedule referred to in these Letters Patent and making part of the same.

*To all whom this may concern:*

Be it known that I, A. W. POWERS, of Barrington, in the county of Cook, and State of Illinois, have invented an Improved Seed-Separator; and I do hereby declare that the following is a full, clear, and exact description of the construction and operation of the same, reference being had to the accompanying drawings, and letters marked thereon, making a part of this description, in which—

Figure 1 is a perspective of a seed-separator, or fanning-mill, with my device attached.

Figure 2, a longitudinal section of the same.

Figure 3, a perspective view of the division cut off, with its crank-attachment removed from the other parts of the separator.

The nature of the present invention consists in the application of a cut-off placed at the tails of the lower sieves, and arranged to conduct seed into a spout, or drawer, at the bottom of the separator; and in an adjustable chute, or shoe, attached to the rear end of the separator, and arranged to conduct oats and seeds of similar size into a half bushel, the upper sieve projecting over the edge of the chute for this purpose. Both devices are operated in combination with the ordinary sieves and shoe of a seed-separator.

To enable others skilled in the art to fully comprehend the construction and operation of my invention, I have marked corresponding parts with similar letters, and will now give a detailed description.

A A represent the ordinary separator, which supports a fan, E, and shoe, B, the latter being arranged to support the sieves and screens $b\ e\ d$, in the usual manner.

C represents a chute, which is attached to the rear end of the separator A A, by means of hooks or staples D, or otherwise as most convenient.

The object of this chute is to conduct oats into a suitable receptacle, placed at or near the side of the separator. The upper sieve $b$, projecting over the edge of the chute C, prevents the oats from falling down at the tail of the shoe B.

When it becomes necessary to conduct other grain into the chute C, it can be adjusted under the sieve which is below the one shown a $tb$, by simply putting additional staples into the separator for supporting the hooks D.

$h\ i$ represent two drawers, which are placed transversely with the separator, and they are made to correspond in length with the width of the shoe, or they may be the full width of the separator.

An inclined spout, or trough, $g$, is placed between the drawers, and used to conduct seed into an elevator, $x$, in the usual manner, and a cut-off, $f$, which is made of wood or other suitable material, is placed over one edge of the spout, and pivoted to the sides A of the separator, one of the pivots terminating in a crank, which is used at the opposite side of the separator, to operate the cut-off, and conduct seed into either the drawer $h$ or spout $g$.

The grain falls on the perforated-zinc sieve $b$, the wheat passing through the holes, and the oats falling into the chute C.

The wheat, after falling through sieve $b$, strikes the chute-board $c$, and is conveyed to sieve $d$, the remaining oats, if any, falling into drawer $i$, and the chess into drawer $h$, after passing through screen $e$.

The cut-off $f$ is set to make two grades of wheat, but if it is turned down, as shown by dotted lines J, one grade will be made, the drawer $i$, in the former case, receiving No. 2.

Having thus fully described my invention,

What I claim, and desire to secure by Letters Patent of the United States, is—

The combination of the cut-off $f$, operating as described, with the spout $g$ and drawer $i$, as and for the purpose specified.

A. W. POWERS.

Witnesses:
 JOHN CLARK,
 J. W. POWERS.